SIMULTANEOUS COLOR TELEVISION

Filed Dec. 14, 1946

INVENTORS
RAY D. KELL
GEORGE C. SZIKLAI
BY
H. G. Grover
ATTORNEY

Patented July 10, 1951

2,560,351

UNITED STATES PATENT OFFICE 2,560,351

SIMULTANEOUS COLOR TELEVISION

Ray D. Kell and George C. Sziklai, Princeton, N. J., assignors to Radio Corporation of America, a corporation of Delaware Application December 14, 1946, Serial No. 716,256

7 Claims. (Cl. 178—5.2)

This invention relates to color television apparatus and is more particularly directed to an all-electronic system for transmitting trains of image signals which, at receiving or monitoring points, may be utilized to recreate the elevision image in substantially its natural color.

As has been known for many years in the transmission of television images in either black and white monochrome or in natural color, the image is analyzed by dividing it into elemental areas which are selected from the complete image or picture area in an orderly sequence by a process of scansion in order to produce signal indications which may then be transmitted one after another as image or video signal trains or series. Because the scanning and image repetition processes are essentially artificial ones, it is possible to choose any arbitrary scanning pattern that is desired so long as the scanning pattern used at the receiver or monitoring points is made to correspond to that employed at the transmitter.

The reproduction of television images in substantially their natural color can be accomplished by additive methods by transmitting signals representative of the image in each of a selected number of primary or component colors, which are three in number for a tricolor system, or which may include, where desired, a monochrome signal addition known as a "key" image to sharpen outlines or for a lower degree of fidelity of color representation even a bicolor system might be adopted. For any of these methods, however, the several produced component-color signal series may be transmitted simultaneously when a simultaneous multicolor method is adopted or may be transmitted in sequence where a sequential additive method is adopted.

For the purpose of the considerations in this disclosure and patent application specification, the simultaneous method of image transmission will be assumed to refer only to the additive processes. In such a method the component colors into which the image is analyzed for either the sequential or the simultaneous process of colored image recreation are usually chosen as red, blue and green, and the sequence for sequential operations may be of any selected and appropriate but, yet, repeating order. The addition of these several color images at receiving points when the scanning operation similar to that occurring at the transmitter station is adopted causes the resultant viewed image replica to appear in substantially the true and natural color at which it appeared at the transmitter point. As is well known in the art, this transmission of images in substantially natural color has been accomplished in the past by so-called sequential methods through the use of moving color filters which are usually selected from three primary or component colors which serve to provide the color separation when these component-color filters have been positioned in the optical path along which the image is directed into the transmitting camera tube and are changed from one to another color at a rate coinciding with each image field scanning. At the receiver end of the system a like set of filters to that of the transmitter is located in the optical path between the image reproducing tube and the observer. The filters at each of the transmitter and receiver reveal the image to the camera tube in sequence in its different component colors at a rate which for tricolor images is usually three or six times the image frame repetition rate, depending upon whether or not the image is to be interlaced and, if interlaced, the assumed factor of six is usually adopted to provide the well-known double interlace operation. Under such circumstances it is at once apparent that the filters of each of the transmitter and receiver must move in absolute synchronism to observe true color operation. Still further, it is essential that correct and like phasing of the component color filters be maintained at each of the transmitter and receiver ends of the system so that the colors when viewed appear in correct relationship.

The employment of mobile color filters as above described has many obvious disadvantages. It has been found that the bulk of the equipment often prevents compact design. It is also evident that moving parts frequently cause noise. They must be synchronized or phased by mechanisms or arrangements which are cumbersome, expensive and difficult to control. They are also subject to mechanical difficulties which often cause interruption of proper functioning and the inherent inertia of rotary elements makes the ready and instantaneous control thereof difficult to achieve.

According to the present invention, images in substantially their natural color are scanned for transmission by apparatus in which no moving mechanical parts or components are included. Such a system is adapted to a simultaneous multicolor transmission method wherein signals of all chosen component colors into which the image is analyzed are cncurrently transmitted so as to be received simultaneously at appropriate receiving points.

Reverting to the form of so-called mechanical color television apparatus which has heretofore been used to some extent and which embodies the sequential presentation of different component color images to the single camera tube, such as an iconoscope, orthicon, or the like, each separate color causes a charge to be built up upon the camera tube mosaic target, which charges are then removed by the scanning operation occurring within the camera tube when the scanning cathode ray beam is caused to traverse, in any appropriate manner, the mosaic target upon which the optical image is directed so as to effect a scanning operation.

Numerous difficulties arise in such operations and among these are the desirability of causing the cathode ray scanning beam in most instances to remain in the shadow between the different component color filter sections as the mosaic is scanned whereby the scanning operation follows in time the revealing of the light of the image to the camera tube in one color, and yet the scanning operation precedes the revealing of the light in the next chosen color to the camera tube mosaic. Various methods must be adopted to prevent intermingling of different color images which would bring about a color carryover effect which would contaminate the color representation. It is not the purpose of this disclosure to go into a discussion of these factors which have been already adequately dealt with heretofore by other workers in the art, although by a bare recognition of them herein, the advantages of the so-called simultaneous multi-color methods are more readily appreciated.

The present disclosure and invention contemplates the generation of trains of video signals for representing the scanned image in each of its several selected and chosen component colors simultaneously. In its preferred form the image to be scanned is preferably illuminated by light generated in a suitable cathode ray tube of the kinescope type, for instance, by the scanning spot produced by the cathode ray beam as it is used to produce the image raster. The cathode ray beam as it traces the image raster is then appropriately focused upon the optical image to be scanned and in accordance with the transparency or reflection of such image, the light passing through the image or reflected therefrom is caused to initiate simultaneously the production of a number of trains of image signals which each represent the scanned image in one component color and which are of a number corresponding to the number of component colors into which the image is analyzed. Furthermore, the present invention is so constituted and arranged that as each separate component color signal is produced, there is always certain to be an inherent registration for each elemental area into which the optical image is assumed to be divided and consequently, registration difficulties in recreating the image at receiver points are minimized, with a result that color action fringes which have heretofore constituted serious limitations on color transmissions are avoided and in recreating the image it is impossible to see a moving white object, for instance, as a sequence of red, blue and green components, due to the travel of the object transverse to the optical path to the camera tube in the time intervening between successive scansions in like colors.

Accordingly, a primary object of this invention is that of providing an improved apparatus and method for developing color television transmission through the analyzing of an image into several component colors and in bringing about such operations simultaneously and concurrently for all component colors whereby inherent registration of the reproduced images is insured.

Another object of this invention is to provide an all-electronic system for the conversion of images in their natural color into electrical signals wherein the signal representative of each component color is transmitted simultaneously with the remainder of the component colors of the image.

Other and incidental objects of the invention will be apparent to those skilled in the art from a reading of the following specification and an inspection of the accompanying drawing in which Figure 1 illustrates schematically this invention in one of its preferred forms;

Figures 1, 2, 3, 4, 5:
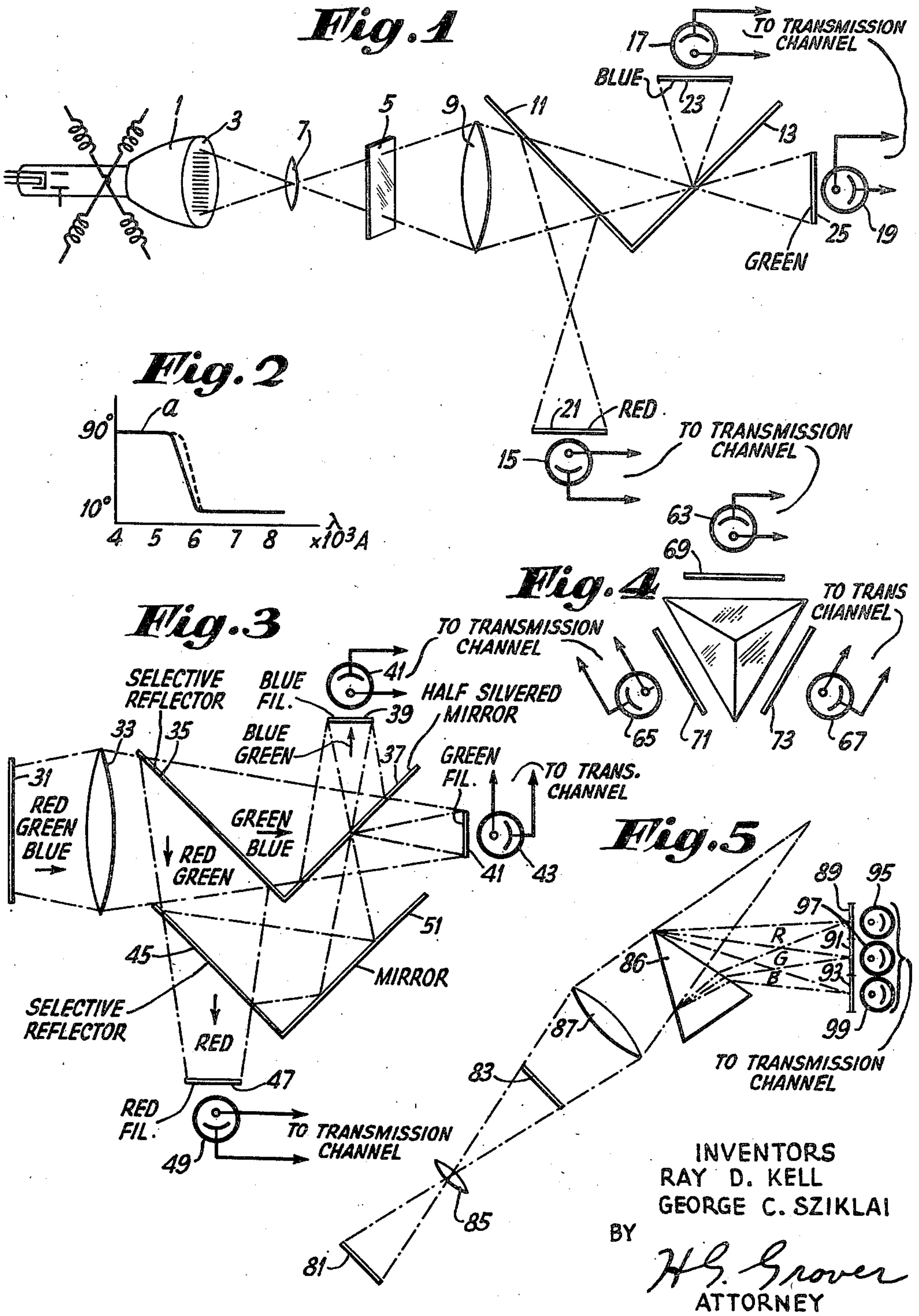
Figure 2 illustrates graphically the operation of this invention in another of its preferred forms.
Figure 3 shows schematically another preferred form of this invention employing selective reflectors for dividing light into its component colors.
Figure 4 and Figure 5 show schematically still other forms of this invention.

Referring now in detail to Figure 1, there is shown an image producing tube or kinescope 1 which is of the type producing a brilliant spot of light on its screen 3. The image tube or kinescope 1 may, for example, be of the projection type shown and described by V. K. Zworykin and W. H. Painter in an article entitled "Development of the Projection Kinescope," beginning on page 937 of the "Proceedings of the Institute of Radio Engineers" for August 1937, volume 25, No. 8. Although normally an image is formed on the face of the image producing tube 3, its application to this invention requires that the spot of light remain at a uniform brilliance to form a scanning raster. Consequently, in producing the raster on the screen of tube 1, the beam is unmodulcated.

The scanning raster produced on the kinsecope tube face 3 is projected and focused on a transparent image 5 which may take the form, for example, of a natural color transparency. The projection and focusing of the scanning raster on the target area or face of tube 1 upon the image 5 is accomplished by an optical system including lens 7.

The light rays which pass through the image area 5 are then directed through the condenser lens 9 which is not necessarily of high optical resolution but which serves to re-focus the divergent rays which pass through the image area.

The light from image 5 is transmitted through lens 9 to be intercepted by half silvered mirrors 11 and 13 which are positioned along the axis of the rays of light and adjusted at an angle such that a portion of the light from image 5 will fall upon photocells 15, 17 and 19 having associated therewith color filters 21, 23 and 25, which are interposed in the light path between the image area 5 and the several photocells. For the purpose of illustration, color filter 21 will be red, color filter 23 will be blue, and color filter 25 will be green. It is well known that these photocells cause the light rays representing the image to be broken down into the selected component colors which, when added together, will reconstruct the original color.

If the optical system is so adjusted that the image 5 focuses on the photocells or the associated color filters, a movement of the image 5 would produce a distortion resulting from a non-uniform pickup. It is therefore desirable that the position of the photocells and filter be out of focus with respect to the image 5.

In a paper by G. L. Dimmick entitled "A New Dichroic Reflector and Its Application to Photocell Monitoring Systems" appearing in the "Journal of the Society of Motion Picture Engineers," volume 38, January 1942, on pages 36-44, there is shown and described a selective reflector which can advantageously be employed for breaking light into its component colors. Although it is unnecessary to here repeat the paper, the operation of this invention in one of its preferred forms will be more readily understood after a brief explanation of the operation of a selective reflector.

It has been known for some time that thin films of some materials are selective in their ability to reflect and transmit light. A thin film of gold is quite transparent to green light and shows strong selective reflection for the red and yellow region. Many aniline dyes appear to have one color when viewed by reflected light and another color when viewed by transmitted light. The material possesses what is known as a surface color, and the transmitted light gets its color by being deprived of certain rays by reflection at the surface and certain others by absorption in the interior.

There is another type of selective reflector which depends upon the interference of light in thin films. This type is far more efficient because the absorption is usually negligible. In its simplest form, this reflector consists of a single thin film between two transparent media. A soap bubble and a layer of oil on water are perhaps the most commonly experienced examples of this type.

If it is desired to make use of the interference principle to obtain a selective reflector capable of reflecting a large percentage of light in the narrow region of the spectrum, it is found that a single thin film would be inadequate for the purpose. Both the intensity and the purity of reflected light may be increased through the use of multiple films arranged in alternate layers having different indices of reflection.

It will be seen that the provision of a selective reflector in place of the half silvered mirror 11 in Figure 1 will result in increased efficiency in the operation of breaking down the light rays into component colors.

Although the employment of selective reflectors removes the necessity for utilization of a color filter such as color filter 21, it is preferred that the color filter 21 be employed and that photocell 15, as well as the other associated photocells, be of the type more sensitive to their respective component color.

It is a characteristic of selective reflectors that the response is not either theoretically or practically perfect, and their reflective and transmission characteristics do not present an ideal curve such that will produce an ideal set of conditions for breaking a ray of light into its component colors. This characteristic can best be explained by reference to Figure 2, wherein the solid line "*a*" in the graph illustrates the reflective characteristic of a typical selective reflector. It will be seen that approximately 90% of the light rays having a wave length up to about 5,000 angstrom units are reflected, whereas only 10% of the light rays having a wave length greater than 6,000 angstrom units are reflected.

It will be seen that such a diagonal cut-off of the reflective curve is not to be desired. If the slope of the curve is increased as shown by the dotted line in Figure 2, a more desirable condition will result. An increased slope of the characteristic curve of the system may be accomplished by employing a plurality of selective reflectors, as shown and described under Figure 3 below.

In Figure 3 there is shown an image 31 which may be similar to image 5 of Figure 1 and a lens 33 for transmitting the rays of light in image 31 through, first of all, the selective reflector 35, which is designed to reflect the long wave length light rays, or the red light end of the color spectrum. The short wave length colors of the light ray, or the blue light end of the color spectrum, pass through selective reflector 35 to a half silvered mirror 37 which divides the resulting short wave length colors of the light rays in two parts. The reflector portion from the half silvered mirror 37 intersects the blue filter 39 in front of the light sensitive device 41. The part of the light ray that passes through the half silvered mirror 37 is directed to the green filter 41, which is positioned in front of the light sensitive device or photocell 43.

The red and a portion of the green part of the light spectrum or the long wave length light of the light rays passing through lens 33 is reflected from selective reflector 35 and passes downward to a second selective reflector 45. The characteristics of the second selective reflector 45 are so chosen that it is complementary to the characteristics of selective reflector 35 and will pass the long wave length light or the end of the spectrum toward the red color through to the red filter 47 and thence to the photocell 49. Because of the sloping characteristic of the reflected light from selective reflector 35, there will be a small amount of green color or middle of the color spectrum light which will be reflected by selective reflector 45 toward a mirror 51. Mirror 51 directs the green light upward to half silvered mirror 37, where it is divided in two parts. The part passing through half silvered mirror 37 has practically no effect on photocell 41 because of the blue filter 39. The part of the green light coming from mirror 51 and reflected from half silvered mirror 37 will be added to that portion of the light transmitted directly through the half silvered mirror 37 from selective reflector 35 to strike green filter 41 and increase the response in photocell 43.

The results of providing a duplex system of selective reflectors will therefore provide an improved color selection and will also provide additional intensity for the component color in the middle region of the light spectrum.

Turning now to Figure 4, there is shown still another form of this invention wherein a three-reflective-sided pyramid 61 has its axis lying along the axis of the light rays which may, for example, be derived in a manner similar to the light rays produced in the system shown and described under Figure 1 above.

Photocells 63, 65 and 67 are positioned adjacent the reflective sides of the pyramid and have associated therewith component colored light filters 69, 71 and 73. The light rays are directed at the pyramid 61 from the front and are then equally divided between the three photocells 63, 65 and 67. It is important, however, that the pyramid of reflective surfaces be out of focus with the colored image in order that a uniform response will be had for each component color regardless of the position of the scanning spot on the image.

Turning now to Figure 5, there is shown still another form of this invention wherein the scanning raster 81 is focused on image 83 through a small diameter lens 85. The light rays from image 83 are directed through prism 86 through lens 87.

Prism 86 acts to break down the light rays coming from image 83 into its component colors. By properly positioning a red filter 89, a green filter 91 and a blue filter 93 in front of three photocells 95, 97 and 99, the light ray from image 83 may be broken down into its component colors and an electrical signal representative of the element of the image 83 being scanned will be produced in the photocells 95, 97 and 99.

It is important, however, that the dispersion of light rays be kept to a minimum. In view of the fact that image 83 is not in effect a point light source, it will be seen that an optical system must be included which will compress all the rays from any position on the image 83 into a point or at least an extremely small area. If the light rays from any position on image 83 are compressed to a small area, the refraction of the light rays passing through prism 86 by different amounts dependent upon the color will permit all red rays to fall on red filter 89 and all green rays to fall on filter 91 and all blue rays to fall on filter 93. This may be accomplished by providing a small diameter lens 85 to focus scanning raster 81 on image 83.

It is desirable that the diameter of lens 85 be small with respect to both the scanning raster 81 and the natural color image 83. It is, of course, also desirable that the power of lens 85 be sufficiently large to cause a brilliant spot of light to scan the image 83. A lens having both a small diameter and high power can, of course, be constructed by utilizing a relatively short focal length.

In the foregoing showing, the photocells 15, 17 and 19 of Figure 1, as well as the photocells shown by any of Figures 3, 4 and 5, are not shown connected to external circuits. It will, however, be understood that in practical operation the photocells each connect to an independent amplifier chain which is capable of passing a wide band of frequencies so that output currents flowing through the photocells due to the scanning operation will produce image or video signals which can be appropriately amplified for transmission in any suitable manner. The photocells thus, in effect, may be regarded as essentially, for the purpose of this illustration at least, performing a function somewhat analogous or equivalent to the normal camera tube in any television transmission system now known, since they convert light into signalling currents. The output signals developed from the photocells will then be combined with suitable blanking and synchronizing signals (in any now known manner) and appropriately transmitted as modulations on a suitable carrier, for instance.

In the arrangement shown, with the scanning cathode ray beam developed within the tube 1 tracing the image raster on the tube screen or target area 3, it will be appreciated that light representative of each point in the image as measured by the light of each component color in the image will be directed to the different photocells and that instantaneously the current flowing in each photocell will be a measure of the brilliance of that component color which is represented by the point on the image 5 which is instantaneously illuminated by the cathode ray beam positioned in the raster. As the cathode ray scanning beam in the tube 1 traces the complete raster, it thus will be appreciated that each point of the image 5 has been illuminated in sequence so that all points finally cause the production of signal currents in one or all of the photocells. Thus, the image 5 is explored in a point-for-point manner by a light spot representing the instantaneous position of the scanning cathode ray beam in the tube 1 as it traces the image raster on the end of the tube. Accordingly, series of video signals representing the image 5 in each of its component colors simultaneously flow in the different transmission channels connected to the several photocells. These signals, at receiving points, can then be used to modulate appropriate cathode ray image producing tubes of the well known kinescope variety which cause the different component color images to appear on the different tubes as a black and white monochrome version of one color. The light image appearing on each tube may be then passed through an appropriate component color filter so that by hinging together the various images for the different component colors in registered manner, the original image is recreated in color. As an alternative, however, it, of course, is apparent that the image producing kinescopes of the receiver units to which the independent signals from the photocells are individually supplied may produce the colors directly where the luminescent compounds coating the tube targets (which would be equivalent to the target face or screen area of the tube 1) are of such luminescent properties as to produce directly light in the selected component colors. This, however, is not to be confused with the image production of the raster area on the face or screen 3 of the tube 1 where, for illumination purposes, the raster produces as closely as possible a true black and white monochrome image area trace.

Having thus described the invention, what is claimed is:

1. In a color television system, means for scanning a color transparency according to a selected scanning pattern with a uniform spot of light of elemental area size, means positioned on the side of said transparency opposite from said scanning means for deriving from said scanning operation rays of light whose instantaneous color is representative of the color of said predetermined elemental area being scanned, at least one dichroic reflector positioned in the path of said rays of light for breaking down said light rays into predetermined component colors, and means to receive said component color rays of light and for deriving from each electrical signal trains representative of the intensity of the several component colors.

2. In a color television system, means for scanning a color transparency with a spot of light adapted to cover a predetermined elemental area of said object, means positioned on the side of said transparency opposite from said scanning means for deriving from said scanning operation rays of light whose instantaneous color is representative of the color of said predetermined elemental area being scanned, two dichroic reflectors positioned in the path of said rays of light for breaking down said light rays into predetermined component colors, and means positioned in the paths of said rays of light for deriving from each of said component colors an electrical signal train representative of the intensity of said component color.

3. In a color-selective reflector system means for creating a light path, a first color-selective reflector in said light path and adapted to transmit short wave length light rays and reflect long wave length light rays, a second color selective reflector in said light path and positioned with respect to said first color-selective reflector to intercept said long wave light rays, said second color-selective reflector having complementary characteristics to said first color-selective reflector, a reflector in said light path and positioned with respect to said second color-selective reflector to intercept short wave light rays from said second color-selective reflector, a partially transparent reflector in siad light path and positioned to intercept said short wave light rays from said first color-selective reflector and the light rays from said reflector, and a plurality of light utilization means located in different positions in said light path.

4. In a color-selective reflector system means for creating a light path, a first color-selective reflector in said light path and adapted to transmit short wave length light rays and reflect long wave length light rays, a second color-selective reflector in said light path and positioned with respect to said first color-selective reflector to intercept said long wave light rays, said second color-selective reflector having complementary characteristics to said first color-selective reflector, a reflector in said light path and positioned with respect to said second color-selective reflector to intercept short wave light rays from said second color-selective reflector, a partially transparent reflector in said light path and positioned to intercept said short wave light rays from said first color-selective reflector and the light rays from said reflector, a first light utilization means in said light path and positioned to intercept said long wave light rays from said second color-selective reflector, a second light utilization means in said light path and positioned to intercept the reflected short wave light rays from said partially transparent reflector, and a third light utilization means in said light path and positioned to intercept the short wave light rays transmitted by said partially transparent reflector.

5. In a color-selective reflector system means for creating a light path, a first color-selective reflector in said light path and adapted to transmit short wave length light rays and reflect long wave length light rays, a second color-selective reflector in said light path and positioned with respect to said first color-selective reflector to intercept said long wave light rays, said second color-selective reflector having complementary characteristics to said first color-selective reflector, a reflector in said light path and positioned with respect to said second color-selective reflector to intercept short wave light rays from said second color-selective reflector, a partially transparent reflector in said light path and positioned to intercept said short wave light rays from said first color-selective reflector and the light rays from said reflector, a first light utilization means in said light path and positioned to intercept said long wave light rays from said second color-selective reflector, a second light utilization means in said light path and positioned to intercept the reflected short wave light rays from said partially transparent reflector, and a third light utilization means in said light path and positioned to intercept the short wave light rays transmitted by said partially transparent reflector, said light utilization means comprising photo-electric devices, together with associated component color filters.

6. In a color-selective reflector system means for creating a light path, a first color-selective reflector in said light path and adapted to transmit short wave length light rays and reflect long wave length light rays, a second color-selective reflector in said light path and positioned with respect to said first color-selective reflector to intercept said long wave light rays, said second color-selective reflector having complementary characteristics to said first color-selective reflector, a reflector in said light path and positioned with respect to said second color-selective reflector to intercept short wave light rays from said second color-selective reflector, a partially transparent reflector in said light path and positioned to intercept said short wave light rays from said first color-selective reflector and the light rays from said reflector, a first light utilization means in said light path and positioned to intercept said long wave light rays from said second color-selective reflector, a second light utilization means in said light path and positioned to intercept the reflected short wave light rays from said partially transparent reflector, and a third light utilization means in said light path and positioned to intercept the short wave light rays transmitted by said partially transparent reflector, said light utilization means comprising photo-electric devices, together with associated component color filters, the color of said component color filters corresponding substantially to the color of the rays of light in which it is positioned.

7. In a color television system, means for scanning a color transparency according to a selected scanning pattern with a spot of light of elemental area size, means for deriving from said scanning operation rays of light whose instantaneous color is representative of the color of said predetermined elemental area being scanned, means positioned in the path of said rays of light for breaking down said light rays into predetermined component colors including a color-selective reflector system comprising in combination a light path, a first color-selective reflector in said light path and adapted to transmit short wave length light rays and reflect long wave length light rays, a second color-selective reflector in said light path and positioned with respect to said first color-selective reflector to intercept said long wave light rays, said second color-selective reflector having complementary characteristics to said first color-selective reflector, a reflector in said light path and positioned with respect to said second color-selective reflector to intercept short wave light rays from said second color-selective reflector, a partially transparent reflector in said light path and positioned to intercept said short wave light rays from said first color-selective reflector and the light rays from said reflector, a first light utilization means in said light path and positioned to intercept said long wave light rays from said second color-selective reflector, a second light utilization means in said light path and positioned to intercept the reflected short wave light rays from said partially transparent reflector, and a third light utilization means in said light path and positioned to intercept the short wave light rays transmitted by said partially transparent reflector, said light utilization means comprising photo-electric devices, together with associated component color filters.

RAY D. KELL.
GEORGE C. SZIKLAI.

REFERENCES CITED

The following references are of record in the file of this patent:

UNITED STATES PATENTS

| Number | Name | Date |
|---|---|---|
| 1,709,926 | Weaver | Apr. 23, 1929 |
| 1,878,147 | Ives | Sept. 20, 1932 |
| 2,001,730 | Ives | May 21, 1935 |
| 2,066,048 | Nyman | Dec. 29, 1936 |
| 2,259,884 | Goldsmith | Oct. 21, 1941 |
| 2,295,628 | Biedermann | Sept. 15, 1942 |
| 2,313,062 | Goldmark | Mar. 9, 1943 |
| 2,352,777 | Donden | July 14, 1944 |
| 2,360,403 | Duinnick | Oct. 17, 1944 |
| 2,379,790 | Duinnick | July 3, 1945 |
| 2,392,978 | Duinnick | Jan. 15, 1946 |